US009445239B2

(12) United States Patent
Reddy

(10) Patent No.: US 9,445,239 B2
(45) Date of Patent: Sep. 13, 2016

(54) LOCATION BASED OPERATION OF A WIRELESS MOBILE SYSTEM

(75) Inventor: Vusthla Sunil Reddy, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 111 days.

(21) Appl. No.: 12/905,541

(22) Filed: Oct. 15, 2010

(65) Prior Publication Data

US 2012/0094684 A1 Apr. 19, 2012

(51) Int. Cl.

| | |
|---|---|
| *H04W 4/00* | (2009.01) |
| *H04W 4/02* | (2009.01) |
| *H04W 8/18* | (2009.01) |
| *H04W 4/20* | (2009.01) |
| *H04W 28/18* | (2009.01) |
| *H04W 64/00* | (2009.01) |

(52) U.S. Cl.
CPC .............. *H04W 4/025* (2013.01); *H04W 4/021* (2013.01); *H04W 4/20* (2013.01); *H04W 8/183* (2013.01); *H04W 28/18* (2013.01); *H04W 64/00* (2013.01)

(58) Field of Classification Search
CPC ....... H04W 8/005; H04W 8/02; H04W 8/04; H04W 60/00; H04W 60/02; H04W 60/04; H04W 64/00; H04W 4/00; H04W 4/001; H04W 8/18; H04W 8/183; H04W 8/22; H04W 40/24; H04W 76/00; H04W 88/00; H04W 88/02–88/06
USPC ............... 455/404.1, 418–422.1, 432.1–446, 455/456.1–457, 13.4, 515, 522, 550.1, 455/552.1, 553.1, 556.1, 556.2, 557, 127.1, 455/127.4, 127.5, 4.1; 370/310.2, 318, 370/328–331, 338, 352–356
See application file for complete search history.

(56) References Cited

U.S. PATENT DOCUMENTS

| | | | |
|---|---|---|---|
| 7,006,837 B2 | 2/2006 | Shiota et al. | |
| 7,177,606 B2 | 2/2007 | Chen | |
| 7,738,865 B2 | 6/2010 | Hughes et al. | |
| 2003/0100307 A1* | 5/2003 | Wolochow et al. | 455/440 |
| 2004/0214539 A1 | 10/2004 | Rajamani et al. | |
| 2004/0253947 A1* | 12/2004 | Phillips et al. | 455/422.1 |
| 2006/0217130 A1* | 9/2006 | Rowitch et al. | 455/456.1 |
| 2006/0221901 A1* | 10/2006 | Yaqub | H04W 48/16 370/331 |
| 2007/0004405 A1* | 1/2007 | Buckley | H04W 48/18 455/434 |
| 2007/0207815 A1* | 9/2007 | Alfano | H04W 48/04 455/456.1 |
| 2007/0237121 A1* | 10/2007 | Khandelwal et al. | 370/338 |
| 2007/0270142 A1* | 11/2007 | Willey | H04W 48/16 455/434 |
| 2008/0176581 A1* | 7/2008 | Abdel-Kader | 455/456.2 |
| 2009/0023458 A1* | 1/2009 | Mountney | H04W 16/14 455/456.1 |
| 2009/0036131 A1* | 2/2009 | Diachina et al. | 455/436 |
| 2009/0270111 A1* | 10/2009 | Nakamura et al. | 455/456.1 |
| 2009/0291686 A1* | 11/2009 | Alpert et al. | 455/436 |
| 2010/0099412 A1* | 4/2010 | Ramachandran et al. | 455/435.2 |
| 2010/0254313 A1* | 10/2010 | Hallenstal et al. | 370/328 |
| 2010/0317371 A1* | 12/2010 | Westerinen | H04M 1/72566 455/456.6 |

* cited by examiner

*Primary Examiner* — San Htun

(74) *Attorney, Agent, or Firm* — Fay Kaplun & Marcin, LLP

(57) ABSTRACT

Operating parameters of a wireless mobile communication device can be adjusted to comply with requirements defined by a local regulatory regime. Location information can be received by the wireless mobile communication device and be used to determine local operating requirements. In one embodiment, location information in the form of MCC-MNC information can be used to query a local database to determine values of local operating limits such as, for example, a local value of a maximum allowable transmission power limit.

17 Claims, 6 Drawing Sheets

LOCATION BASED OPERATION OF A WIRELESS MOBILE SYSTEM

TECHNICAL FIELD

The described embodiments relate generally to wireless mobile communications. More particularly, a method and apparatus is described for providing location specific operating limits for a mobile wireless system.

BACKGROUND

Part of the regulatory environment in which a mobile wireless system, such as a cell or smart phone, requires that the mobile wireless system operate within well defined constraints. These constraints can be regulatory in nature by which it is meant that local regulations are promulgated by a local regulatory agency (such as the Federal Communications Commission, or FCC). Therefore, as the wireless mobile system relocates from one locality to another, there remains the possibility that what is acceptable operating behavior in one location may not be acceptable in a current location rendering any operation of the mobile wireless device out of compliance with the local regulations.

In order to assure that the mobile wireless device complies with all known regulations in all known localities, original equipment manufacturers (OEMs) generally set the operating characteristics of the mobile wireless device to meet the most conservative regulations. In this way, there is no possibility that the mobile wireless system is out of compliance regardless of its current location. Unfortunately, however, by limiting the operation of the mobile wireless system to the most conservative regulations can cause the operation of the mobile wireless system to be less than what it could be in those locations having more liberal regulations. This is particularly irksome for those individuals that rarely, if ever, use their wireless mobile systems outside of a home location or at least in locations that have consistent regulatory requirements, such as within a single country having a more liberal regulator environment than that assumed for the mobile wireless system.

Thus there exists a need to provide a location based set of operating characteristics to which a wireless mobile system can operate consistent with the local regulatory environment.

SUMMARY OF THE DESCRIBED EMBODIMENTS

The described embodiments relate generally to wireless mobile communications. More particularly, a method and apparatus is described for operating a mobile wireless communication device in accordance with a local regulatory regime.

In one embodiment, a method performed at a wireless mobile communication device can be carried out by determining a local operating parameter based upon a current location of the wireless mobile communication device and setting an operating characteristic of the wireless mobile communication device in accordance with the local operating parameter. In a particular embodiment, the current location of the wireless mobile communication device is provided by a base station at network registration. For example, in a UMTS network, the location information can be provided in a sync message provided by a nearby base station. The sync message can include a system identifier that can have associated MCC-MNC information included therein.

In another embodiment, a mobile wireless communication device includes an application processor and a transceiver. The transceiver is coupled to the processor and arranged to support a communicate channel with a wireless network. The processor causes the mobile wireless communication device to operate in accordance with a local operating parameter the local operating parameter in accordance with a current location of the mobile wireless communication device. In a particular embodiment, the operating parameter is a maximum allowed transmission power level.

In yet another embodiment, non-transitory computer readable medium for storing a computer program executable by a processor in a wireless mobile communication device. The computer readable medium can include at least computer code for determining a local operating parameter based upon a current location of the wireless mobile communication device and computer code for setting an operating characteristic of the wireless mobile communication device in accordance with the local operating parameter.

In still another embodiment, a method of operating a wireless mobile communication device based upon a local regulatory regime is described. The method can be carried out by powering up the wireless mobile communication device, registering the wireless mobile communication device with a local wireless network, receiving location information in accordance with the registering, the location information indicative of a current location of the wireless mobile communication device, accessing a locally stored database, the locally stored database including location based regulatory requirements, using the location information to query the locally stored database, obtaining the location based regulatory requirements corresponding to the current location, and setting operating parameters of the wireless mobile communication device based upon regulatory requirements obtained from the local database.

In a particular embodiment, when the mobile wireless communication device is moved to a new current location, then, if necessary, the operating parameters of the mobile wireless communication device is updated in accordance with the new current location.

BRIEF DESCRIPTION OF THE DRAWINGS

The invention and the advantages thereof may best be understood by reference to the following description taken in conjunction with the accompanying drawings.

DETAILED DESCRIPTION OF THE EMBODIMENTS

Figure 1:
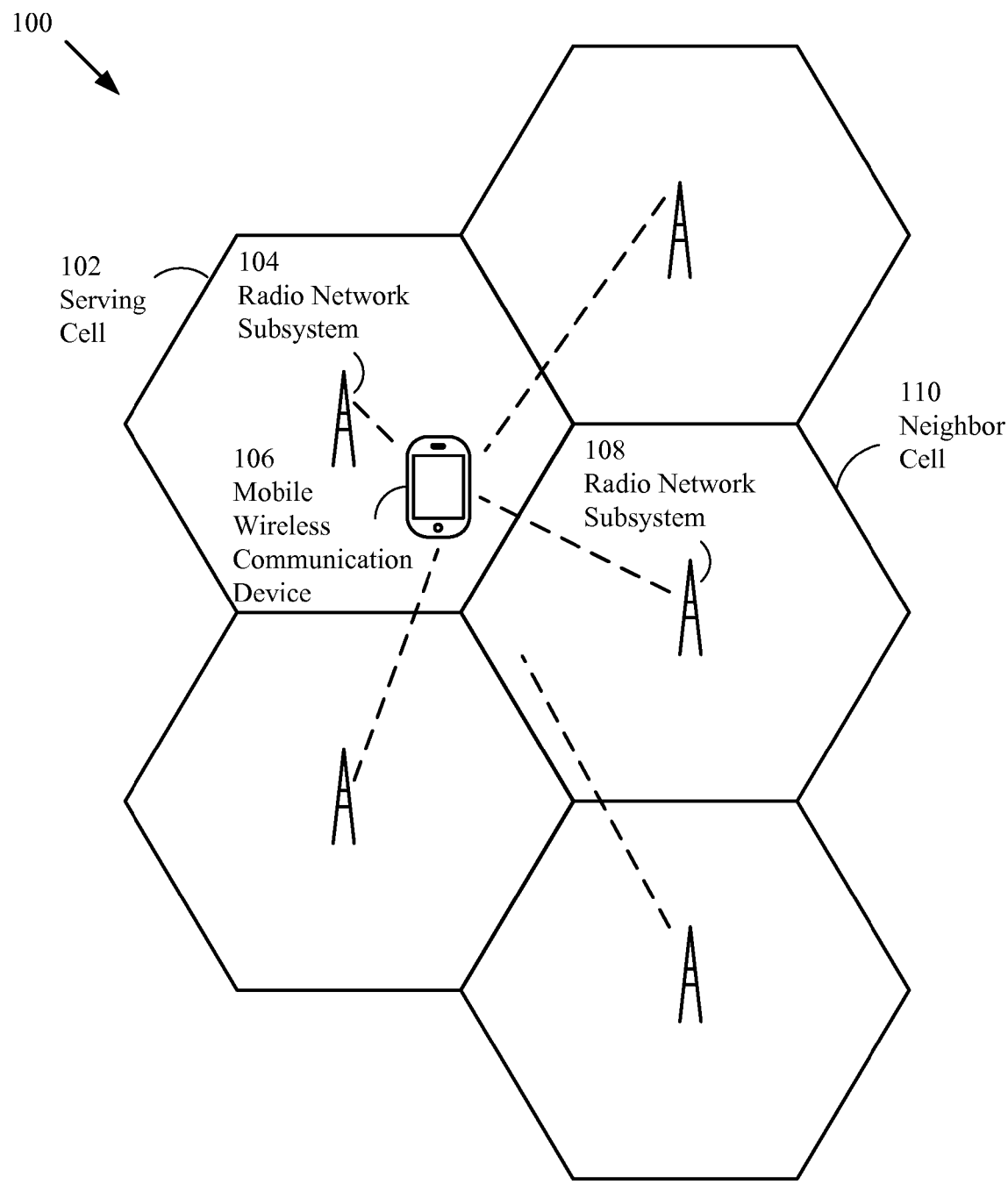
FIG. 1 illustrates a mobile wireless communication device located within a wireless cellular communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Mobile wireless communication devices, such as a cellular telephone or a wireless personal digital assistant, can offer multiple communication services ranging from basic voice connections to text messaging to multi-media internet access. While a single manufactured mobile wireless communication device can include the capability to access a broad variety of services, a wireless service provider can restrict access to a set of services to which a user of the mobile wireless communication device subscribes. Additionally a wireless communication service provider can prefer to customize operational characteristics of the mobile wireless communication device when used on a particular wireless communications network. Customization can include, for example, to which short message service (SMS) or voice mail server the mobile wireless communication device points, or how the mobile wireless communication device connects to internet access.

Universal integrated circuit cards (UICC) are a form of "smart card" used in mobile wireless communication devices on various wireless communication networks. A well-known version of a UICC is a subscriber identity module (SIM) card that can be used in mobile wireless communication devices on Global System for Mobile Communications (GSM) wireless communication networks. Equivalents of SIM cards also include USIM cards on universal mobile telecommunication system (UMTS) networks and CSIM cards on Code Division Multiple Access (CDMA) networks. SIM cards can be issued by a wireless communication service provider to a user of a mobile wireless communication device. The SIM card can be inserted into the mobile wireless communication device and enable that device to identify a user of the mobile wireless communication device as a subscriber of set of services offered by a particular wireless communication service provider. The SIM card contains a unique serial number known as an international mobile subscriber identity (ISMI) that can authenticate a user of a mobile wireless communication device to a wireless communication service provider through its wireless communication network. Portions of the IMSI can be accessed from the SIM card in a mobile wireless communication device to configure the device for a particular wireless communication service provider's network.

A manufacturer can supply the same mobile wireless communication device to multiple wireless communication service providers, each provider requiring a different customization. Customizing mobile wireless communication devices at the time of manufacture can prove logistically complex; thus it is preferable to customize each mobile wireless communication device closer to the point of sale to the user of the mobile wireless communication device. More particularly, the customization of the mobile wireless communication device should comprehend the specific regulatory environment in which the mobile wireless communication device is operating. This is particular relevant to operating characteristics that can vary widely based up the regulatory constraints promulgated by a country's wireless regulatory agencies. In this way, when a user of the mobile wireless communication device is roaming from one regulatory regime to another, it is important that the mobile wireless communication device operate within the limitations of the local wireless regulations that may vary significantly from one regime to another. However, it is also important that the operation of the mobile wireless communication device conforms to the local regulations without unnecessary constraints. For example, if country A has a maximum power transmission level of 23 dBm and country B has a limit of 21 dBm, then the mobile wireless communication should operate as close to but not exceed the 23 dBm limit while in country A and 21 dBm limit while in country B.

In the described embodiments, at system acquisition, the location of the mobile wireless communication device can be determined based upon MCC-MNC information. In a GSM network, the MCC-MNC information can be provided as part of a system identifier used by a base station to identify an associated wireless network. However, in a UMTS network, the MCC-MNC information can be provided by the service provider at system acquisition. In accordance with ANSI-41 Standards Technology (IFAST), a system identifier, or SID, provided to the wireless mobile communication device at system acquisition can be mapped to a country using a mobile country code or MCC and mobile network code, or MNC. In this way, a list of SIDs (SID table) that cross references MCC-MNC information to a particular country can be stored in wireless mobile communication device. Therefore, the wireless mobile communication device can execute a table lookup of the SID table to determine the country in which wireless mobile communication device is currently located using the MCC-MNC information. The MCC-MNC information can then be used to identify wireless operating parameters consistent with the operating limits set by the appropriate regulatory agencies in the country associated with the MCC-MNC.

MCC-MNC information can be used to identify values of operating parameters consistent with the specific location identified by the MCC-MNC. For example, based upon the local regulatory regime, the mobile wireless communication device can have a maximum power transmission level set specific to the country associated with the MCC-MNC information. In this way, the operation of the wireless mobile communication device can be well customized to the location in which the wireless mobile communication device is operating. It should be noted that any changes in a local regulatory environment can be manifested in the look up table by updating the look up table whenever necessary to reflect any changes in operating parameters for a particular country. In this way, the look up table can reflect the most current operating parameters based upon local regulations.

FIG. 1 illustrates a wireless communication network 100 of overlapping wireless communication cells to which a mobile wireless communication device 106 can connect. In the context of this discussion, the term wireless mobile communication device can be used interchangeably with the terms user equipment (UE), subscriber unit (SU), subscriber station (SS), access terminal (AT), remote terminal (RT), mobile system (MS) or other corresponding terms known in the art. The wireless communication network 100 can operate according to one or more different communication protocols such as a Global System for Communications (GSM) protocol, a Universal Mobile Telecommunications System (UMTS) protocol or a Long Term Evolution (LTE) protocol developed and maintained by the Third Generation Partnership Project (3GPP), a collaboration of several telecommunication standards organizations. Alternatively, the wireless communication network 100 can operate using one of the set of Code Division Multiple Access 2000 (CDMA2000) standards developed by the 3GPP2. The discussion herein will primarily focus on wideband CDMA (WCDMA) as defined in UMTS, but the same ideas can apply to other wireless access network technologies.

Each wireless communication cell can cover a geographic area extending from a centralized radio network subsystem (RNS). Representative mobile wireless communication devices 106 can include "smart" phones and mobile computing devices having wireless connectivity capabilities. The mobile wireless communication device 106 can receive communication signals from a number of different cells in the wireless communication network 100, each cell located at a different distance from the mobile wireless communication device 106. The mobile wireless communication device 106 can be connected to a radio network subsystem 104 in a serving cell 102 and can be aware of neighbor cells in the wireless communication network 100, such as radio network subsystem 108 in neighbor cell 110. The radio resources that connect the mobile wireless communication device 106 to a cell can be limited and shared among multiple mobile wireless communication devices.

As radio frequency energy of a transmission can decrease with distance traveled, the mobile wireless communication device 106 can transmit at higher power levels when located farther away from the radio network subsystem 104 than when located closer. Transmitting at a higher power level by the mobile wireless communication device 106 can ensure signals received at the radio network subsystem 104 in the serving cell 102 can meet a required reception level. As multiple mobile wireless communication devices 106 can share the same radio frequency spectrum when transmitting in the uplink direction to the radio network subsystem, the wireless communication network 100 can limit the maximum transmit level of the mobile wireless communication device 106 during any particular transmit time interval (TTI) to minimize interference between different mobile wireless communication devices 106. In any case, however, the maximum permissible transmission power level is set by local regulations as illustrated in Table 1 showing representative maximum power transmission levels (in dBm) for various communication technologies.

TABLE 1

| MCC | MNC | TECHNOLOGY | BAND | MAX ALLOWED TX POWER (dBm) |
|---|---|---|---|---|
| 262 | 1 | UMTS | IMT2K 2100 | 23 |
| 262 | 1 | GSM | GSM 1800 | 22 |
| 310 | 38 | UMTS | PCS 1900 | 21 |
| 310 | 38 | GSM | GSM 1900 | 21 |
| 261 | 2 | UMTS | IMT2K 2100 | 23 |

Figure 2:
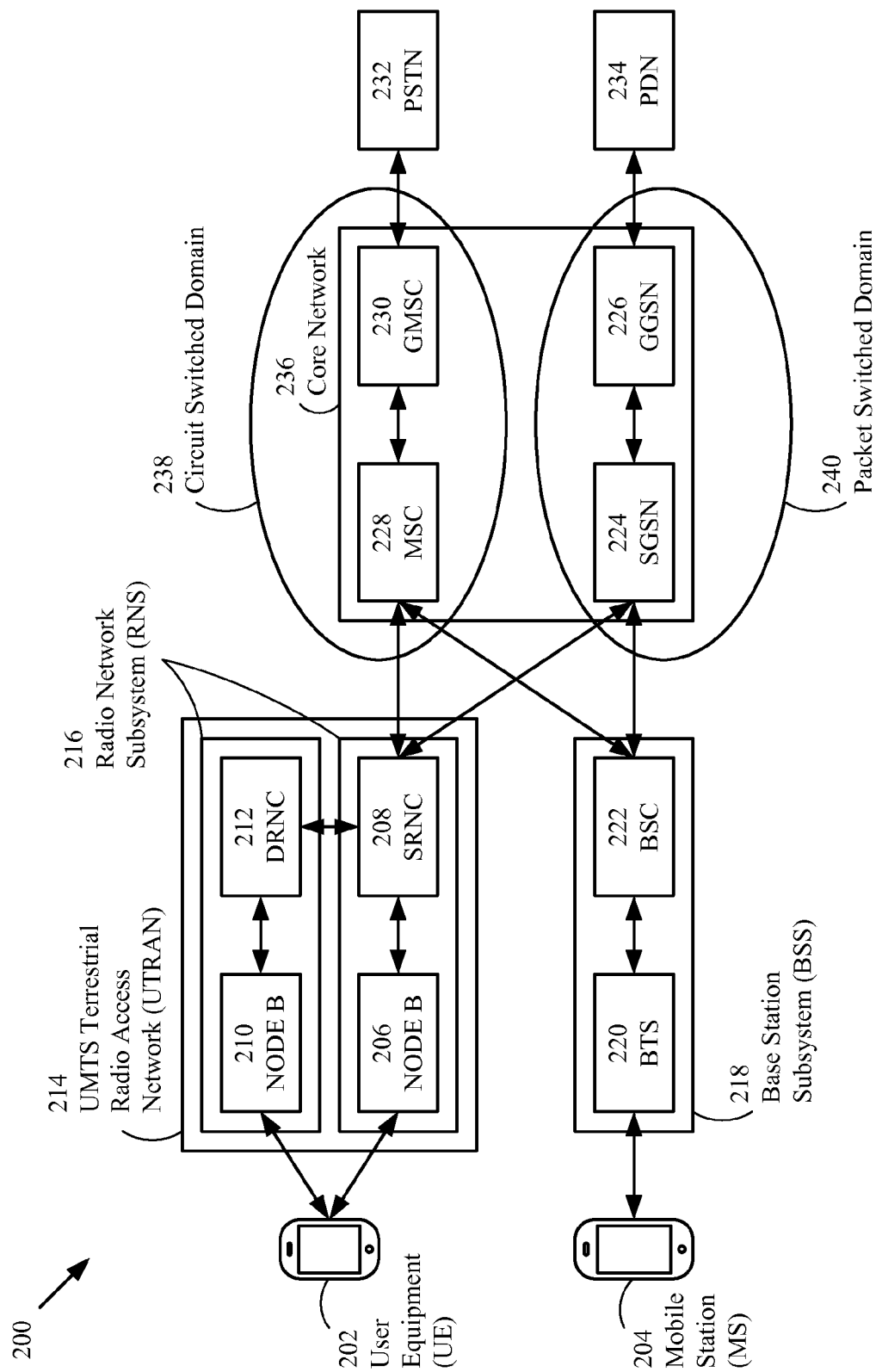
FIG. 2 illustrates a hierarchical architecture for a wireless communication network.

FIG. 2 illustrates a hybrid hierarchical architecture 200 for a wireless communication network that includes both UMTS and GSM radio access network elements. A mobile wireless communication device 106 operating in a GSM wireless communication network can be referred to as a mobile station (MS) 204, while a mobile wireless communication device 106 operating in a UMTS network can be referred to as user equipment (UE) 202. (Wireless mobile communication devices 106 can include the capability of connecting to multiple wireless communication networks that use different wireless radio network technologies, such as to a GSM network and to a UMTS network; thus the description that follows can also apply to such "multi-network" devices as well as single network devices.) The MS 204 can connect to the GSM wireless communication network through a radio network subsystem known as a base station subsystem (BSS) 218. The BSS 218 can include a base transceiver station (BTS) 220 that transmits and receives radio frequency signals between the MS 204 and the wireless communication network and a base station controller (BSC) 222 that manages the communication between a core network 236 and the MS 204. In a GSM wireless communication network, an MS 204 can be connected to one BSS 218 at a time. As the MS 204 moves throughout the GSM wireless communication network, the BSC 222 can manage handover of the MS 204 to different BTS 220 located in different cells. The GSM radio access network BSS 218 connects to a centralized core network 236 that provides circuit switching and packet switching capabilities. The packet switching capability can provide a General Packet Radio Service (GPRS) that transmits internet protocol (IP) packets between the MS 204 and external data networks.

The core network 236 can include a circuit switched domain 238 that can carry voice traffic to and from an external public switched telephone network (PSTN) and a packet switched domain 240 that can carry data traffic to and from an external public data network (PDN). The circuit switched domain 238 can include multiple mobile switching centers (MSC) 228 that connect a mobile subscriber to other mobile subscribers or to subscribers on other networks through gateway MSCs (GMSC) 230. The packet switched domain 240 can include multiple support nodes, referred to as serving GPRS support nodes (SGSN) 224, that route data traffic among mobile subscribers and to other data sources and sinks in the PDN 234 through one or more gateway GPRS support nodes (GGSN) 226. The core network 236 can be commonly used by multiple radio link access network subsystems that use different radio link technologies. As shown in FIG. 2, both a UMTS terrestrial radio access network (UTRAN) 214 and a GSM BSS 218 can connect to the same core network 236.

The circuit switched domain 238 and the packet switched domain 240 of the core network 236 can each operate in parallel, and both domains can connect to different radio access networks simultaneously. The UTRAN 214 in the UMTS wireless access network can include multiple radio network subsystems (RNS) 216. Each RNS 216 can include a "Node B" 206/210 that transmits and receives radio frequency signals and a radio network controller (RNC) 208/212 that manages communication between the "Node B" 206/210 network elements and the core network 236. Unlike the MS 204 in the GSM radio access network, the UE 202 can connect to more than one radio network subsystem (RNS) 216 simultaneously. One RNS 216 can include a "serving" radio network controller (SRNC) 208 that maintains the logical connection between the UE 202 and the core network 236 through a primary Node B 206. A second RNS 216 can include a "drift" radio network controller (DRNC) 208 that provides additional radio link resources through a secondary Node B 210 that supplements the radio link through the primary Node B 206.

A UMTS wireless communication network can use a wireless communication radio link technology known as wideband code division multiple access (W-CDMA). W-CDMA transmissions can occupy a relatively wide bandwidth based on a direct sequence spread spectrum modulation. Transmissions between a UE 202 and an RNS 216 in a UMTS network can be modulated by a spreading code, and each UE 202 connected to the RNS 216 can use a different spreading code but transmit simultaneously using the same radio frequency spectrum. Received signals can be demodulated by the Node B 206/210 by correlating the received signals with a correctly matched de-spreading code. As a set of spreading codes used in W-CDMA transmissions can be mutually orthogonal, uplink transmission signals from a particular UE 202 can be separated from uplink signals transmitted from other UE, even though all of the uplink transmission signals can overlap and use the same radio frequency spectrum simultaneously. UMTS spread spectrum signals can occupy a wider 5 MHz channel bandwidth compared with a narrower 200 kHz channel bandwidth used by GSM signals.

Figure 3:
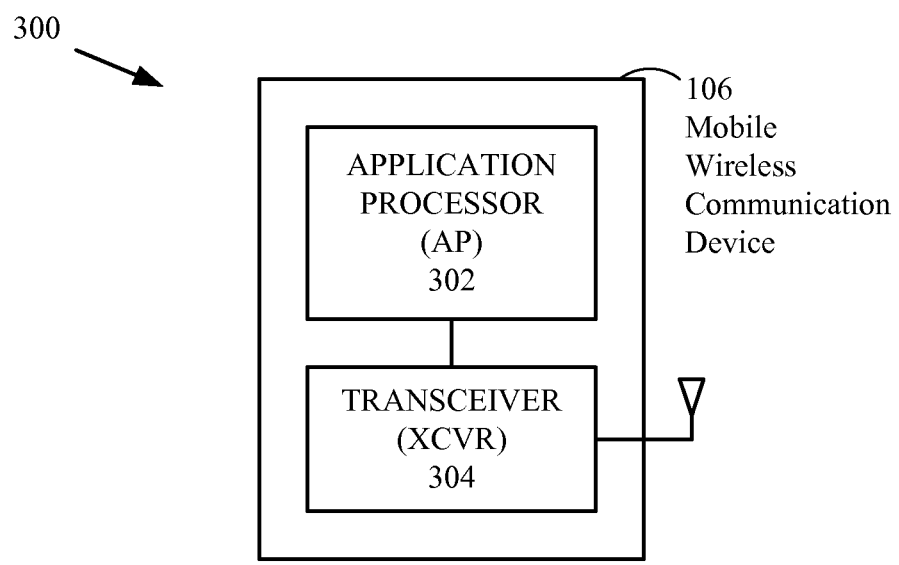
FIG. 3 illustrates components of the mobile wireless communication device.

FIG. 3 illustrates typical components of the mobile wireless communication device 106 such as the UE 202. An applications processor (AP) 302 can perform higher layer functions, such as maintaining an IP stack and requesting and releasing data connections. A transceiver (XCVR) 304 in the mobile wireless communication device 106 can transmit and receive lower layer packets that correspond to higher layer signaling and data packets through a radio "air" interface to the RNS 216 in the wireless communication network 100. In some embodiments, the application processor 302 and the transceiver 304 can be separate devices, while in other embodiment functions performed by the application processor 302 and the transceiver 304 can be combined in a single device.

Figure 4:
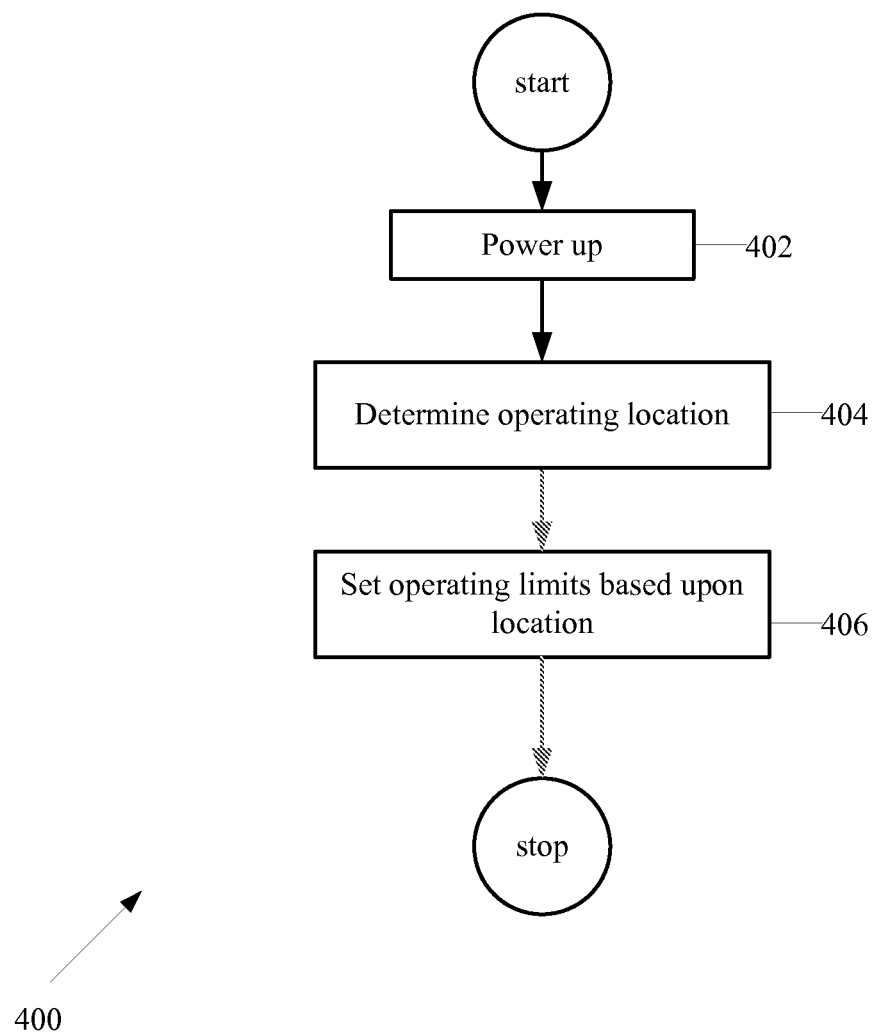
FIG. 4 shows a flowchart detailing a process in accordance with the described embodiments.

FIG. 4 shows a flowchart detailing process 400 in accordance with the described embodiments. Process 400 can be carried out starting at 402 by powering on a mobile wireless communication device. At power on, the mobile wireless communication device can receive acquisition information from a base station specific to a wireless service provider. As part of the acquisition information, location information can be provided that can indicate a current location that the mobile wireless communication device is operating. In this way, at 404, the current location of the mobile wireless communication device can be determined. The location information can then be used at 406 to determine operating parameters specific to the current location.

The operating parameters can include, for example, a limit on maximum power transmission for the wireless mobile communication device. In the described embodiment, the operating parameters can be stored locally at the wireless mobile communication device in the form of a look up table that can cross reference specific location information and operating parameter information. It should also be noted that the look up table can be periodically updated to reflect changes in specific regulatory requirements for each country listed on the table. Furthermore, the look up table can be updated to include additional countries based upon the roaming experienced by the wireless mobile communication device.

Figure 5:
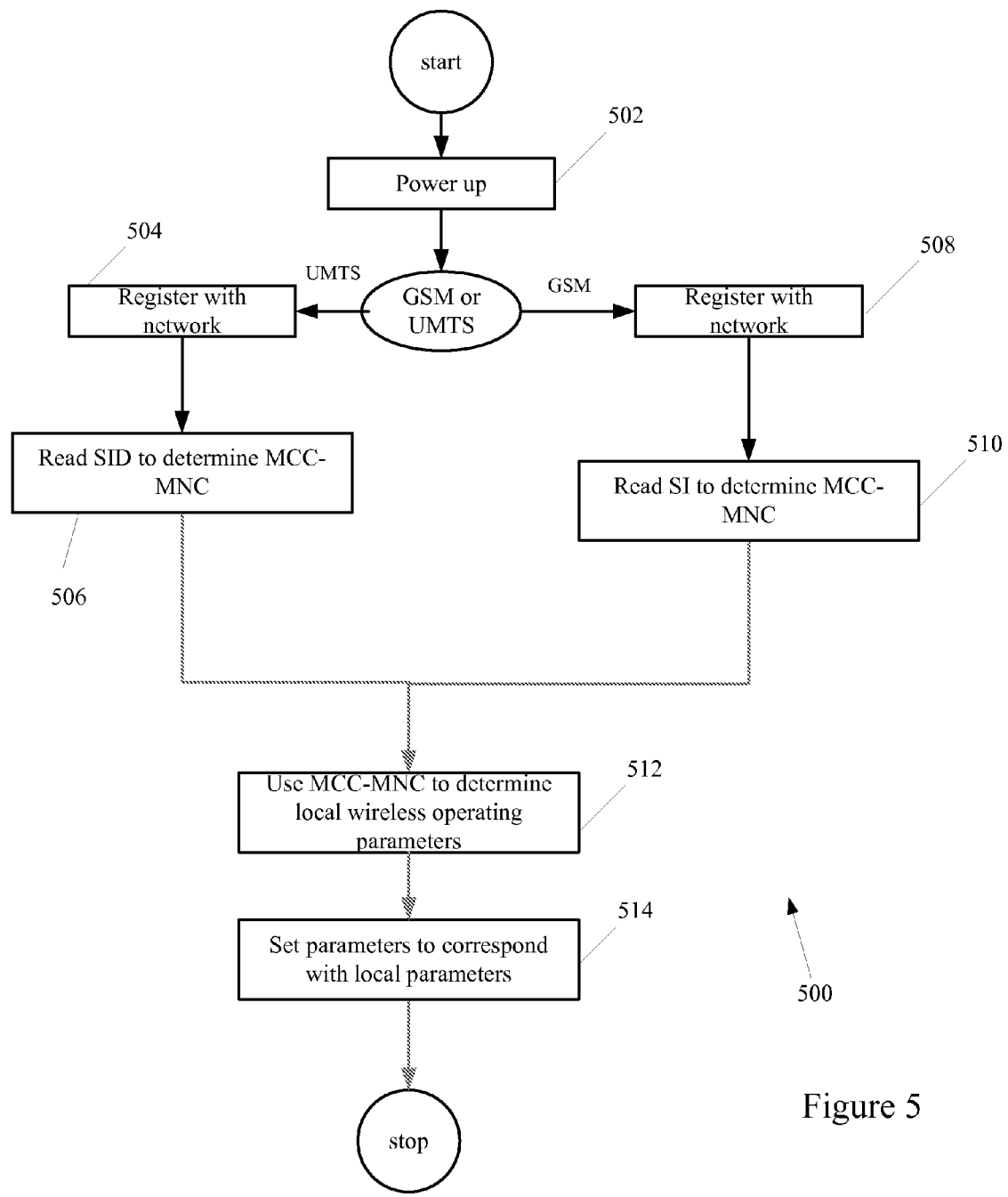
FIG. 5 shows a flowchart detailing a process as a specific implementation of the process described in FIG. 4.

FIG. 5 shows a flowchart detailing process 500 as a specific implementation of process 400 described above. In particular, process 500 can be performed by carrying out at least the following operations. At 502, the mobile wireless communication device is powered up. Next, the mobile wireless communication device registers with a compatible network. For example, at 504, the wireless mobile communication device registers at a UMTS network and then at 506, the MCC-MNC information is read from system identifier (SID) information provided by the base station. For example, the SID can be provided as part of the information provided by in the pilot channel broadcast by the base station. On the other hand, when the mobile wireless communication device registers at 508 at a GSM network, then the MCC-MNC information is read from the system identification provided by the base station at 510.

In any case, once the mobile wireless communication device has acquired the appropriate MCC-MNC information (regardless of the network type) at 512, a table look up is carried out to determine the appropriate operating parameters for the mobile wireless communication device. At 514, the mobile wireless communication device is then set to operate within the limits provided by the table look up operation.

Figure 6:
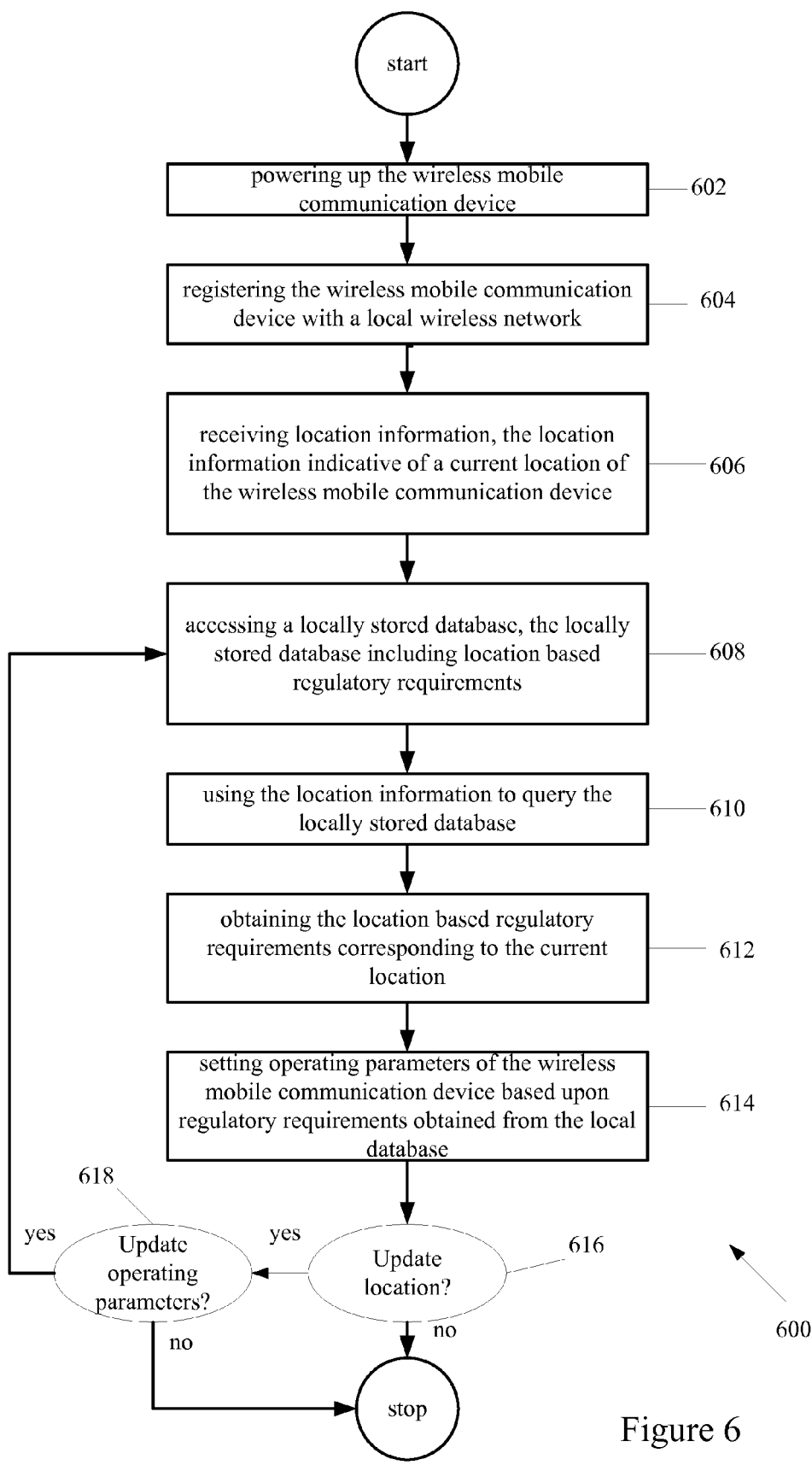
FIG. 6 shows a flowchart detailing a process in accordance with the described embodiments.

FIG. 6 shows a flowchart describing process 600 carried out by a mobile wireless communication device in accordance with the described embodiments. Process 600 can be performed by powering up the wireless mobile communication device at 602 and registering the wireless mobile communication device with a local wireless network at 604. At 606, location information can be received, the location information indicative of a current location of the wireless mobile communication device. At 608, a locally stored database is accessed. In the described embodiment, the locally stored database including location based regulatory requirements. At 610, the location information is used to query the locally stored database and at 612, the results of the query are used to obtain the location based regulatory requirements corresponding to the current location. At 614, the operating parameters of the mobile wireless communication device are set in accordance with the local regulatory requirements. At 616, a determination if made if the current location of the mobile wireless device has been updated. If the current location has not been updated then process 600 ends otherwise control is passed to 618 to evaluate if the operating parameters of the mobile wireless communication device are required to be updated. If no updating is required then process 600 ends otherwise control is passed to 608 for updating of the operating parameters consistent with the updated current location of the mobile wireless communication device.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A mobile wireless communication device comprising:
a processor, and
a transceiver, in data communication with to the processor, the transceiver configured to support a plurality of wireless cellular networks;
wherein the processor is configured to run at least one process thereon, the at least one process comprising a plurality of instructions configured to, when executed, cause the processor to:
register the mobile wireless communication device with one of the plurality of wireless cellular networks accessible by the transceiver;
receive location information indicative of a current location of the mobile wireless communication device;
access a database of location dependent operational parameters that is stored locally at the mobile wireless communication device, wherein the operational parameters are based on regulatory requirements for at least the current location and wherein the database is periodically updated;
query the database with the current location of the mobile wireless communication device;
identify one or more location dependent operational parameters that correspond to the current location based upon the query, wherein the one or more location dependent operational parameters comprise a maximum allowable transmission power level;
based on the current location, configure the one or more operational parameters of the transceiver;
establish, via the transceiver, a communication channel with the registered wireless cellular network; and
cause the mobile wireless communication device to operate in accordance with the one or more location dependent operational parameters.

2. The mobile wireless communication device as recited in claim 1, wherein the received location information comprises mobile country code-mobile network code (MCC-MNC) data.

3. The mobile communication device as recited in claim 1, wherein receiving the location information includes using a first location acquisition process based on a first wireless cellular network and using a second location acquisition process based on a second wireless cellular network.

4. A method of operating a wireless mobile communication device based upon a local regulatory regime, comprising:
powering up the wireless mobile communication device, the wireless mobile communication device configured to support a plurality of wireless cellular networks;
registering the wireless mobile communication device with a one of the plurality of wireless cellular networks accessible by the wireless mobile communication device;
receiving location information of the wireless mobile communication device, where the location information identifies a country where the registered wireless cellular network is deployed, and wherein receiving the location information includes using a first location acquisition process based on a first wireless cellular network and using a second location acquisition process based on a second wireless cellular network;
accessing a locally stored database including one or more location dependent operational parameters based on regulatory requirements corresponding to the location information, where the locally stored database is periodically updated;
obtaining the one or more location dependent operational parameters corresponding to the location information, wherein the one or more location dependent operational parameters comprise a maximum allowable transmission power level; and
setting the one or more location dependent operating parameters of the wireless mobile communication device based upon the regulatory requirements obtained from the locally stored database.

5. The method as recited in claim 4, wherein the plurality of wireless cellular networks comprises a universal mobile telecommunication system (UMTS) network, and the location information is read from a system identifier (SID) information provided by the UMTS network.

6. The method as recited in claim 4, wherein the plurality of wireless cellular networks comprises a global system for mobile communication (GSM) network, and the location information is read from a mobile country code-mobile network code (MCC-MNC) provided by the GSM network.

7. The method as recited in claim 4, wherein the locally stored database is periodically updated based upon the roaming experienced by the wireless mobile communication device.

8. The method as recited in claim 4, wherein the one or more location dependent operating parameters further comprise an address for a short message service (SMS) or voice mail server.

9. The method as recited in claim 4, wherein receiving the location information includes using a first location acquisition process based on a first wireless cellular network and using a second location acquisition process based on a second wireless cellular network.

10. A mobile wireless communication device comprising:
a transceiver, the transceiver configured to support a plurality of wireless cellular networks;
logic configured to register the wireless mobile communication device with a one of the plurality of wireless cellular networks accessible by the transceiver;
logic configured to receive location information indicative of a current location of the mobile wireless communication device, wherein receiving the location information includes using a first location acquisition process based on a first wireless cellular network and using a second location acquisition process based on a second wireless cellular network;
logic configured to track roaming experienced by the mobile wireless communication device;
logic configured to determine, based on the current location, one or more location dependent operational parameters of the transceiver, where the one or more location dependent operational parameters are stored locally at the mobile wireless communication device in a look up table that is configured to cross reference the location information with the one or more location dependent operational parameters, and where the look up table is updated based upon the tracked roaming experienced by the mobile wireless communication device; and
logic configured to establish a communication channel with the registered wireless cellular network in accordance with the one or more location dependent operational parameters, wherein the one or more location dependent operational parameters comprise a maximum allowable transmission power level.

11. The mobile wireless communication device as recited in claim 10, wherein the plurality of wireless networks comprises a universal mobile telecommunication system (UMTS) network, and the location information is a system identifier (SID) information provided by the UMTS network.

12. The mobile wireless communication device as recited in claim 10, wherein the plurality of wireless networks comprises a global system for mobile communication (GSM) network, and the location information is a mobile country code-mobile network code (MCC-MNC) provided by the GSM network.

13. The mobile wireless communication device as recited in claim 10, wherein the look up table is updated according to a periodic basis.

14. The mobile wireless communication device as recited in claim 10, further comprising logic configured to determine whether the current location has been updated.

15. The mobile wireless communication device as recited in claim 14, wherein when the current location has been updated, the logic is configured to determine whether the one or more location dependent operational parameters should be updated.

16. The mobile wireless communication device as recited in claim 10, wherein the one or more location dependent operational parameters comprise an address for a short message service (SMS) or voice mail server.

17. The mobile wireless communication device as recited in claim 10, wherein receiving the location information includes using a first location acquisition process based on a first wireless cellular network and using a second location acquisition process based on a second wireless cellular network.

* * * * *